R. D. S. BENNETT.
SHOE.
APPLICATION FILED SEPT. 19, 1912.
1,085,010.
Patented Jan. 20, 1914.
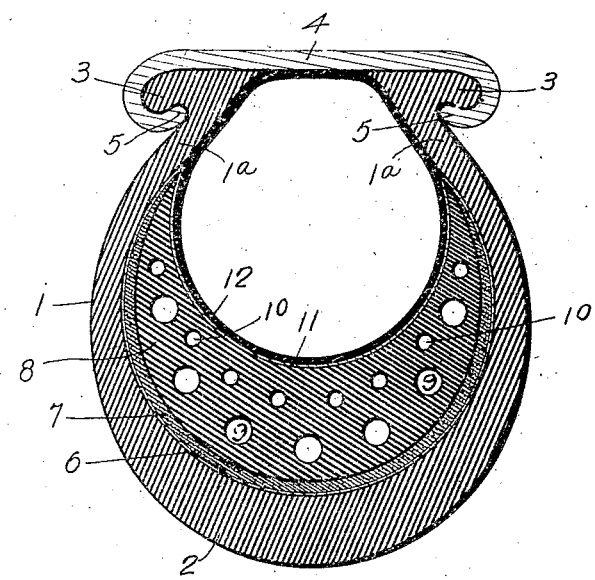
WITNESSES
INVENTOR
REUBEN D. S. BENNETT
ATTORNEYS

UNITED STATES PATENT OFFICE.

REUBEN DAVID S. BENNETT, OF SPRINGFIELD, MISSOURI.

SHOE.

1,085,010.

Specification of Letters Patent. Patented Jan. 20, 1914.

Application filed September 19, 1912. Serial No. 721,285.

*To all whom it may concern:*

Be it known that I, REUBEN D. S. BENNETT, a citizen of the United States, and a resident of Springfield, in the county of Greene and State of Missouri, have invented a new and useful Improvement in Shoes, of which the following is a specification.

My invention relates to tires and parts associated therewith, my more particular purpose being to provide an improved form of cushion shoe forming practically a part of the tire and adapted for maintaining the firmness thereof while permitting a considerable degree of resilience in the tire.

My invention further relates to improvements in shoes or cushions forming parts of tires and carried thereby, for the purpose of increasing the general efficiency of such structures.

Reference is made to the accompanying drawing forming a part of this specification, and in which the figure shows a cross section through a wheel rim and tire provided with my invention.

The tire casing is shown at 1 and may be of the usual or any desired construction. It is provided with a thread portion 2 and with flanges 3. The wheel rim is shown at 4 and carries a pair of annular flanges 5 adapted for projecting under the flanges 3 of the tire casing. An envelop 6 made of cloth is located inside of the casing 7, and disposed within the envelop 6 is a strip 7 of leather, the edges of this strip being thinned off and thus rendered comparatively sharp. Engaging this leather strip and partially encircled thereby is a cushion 8 made preferably of rubber and provided with passages 9, 10 extending in the general direction of the tire. The passages 9, 10 are of substantially cylindrical form in cross section, the passages 9 being each of greater diameter in cross section than the passages 10, as will be understood from the drawing. The cushion 8, as seen in cross section, has a crescent form and its inner surface is engaged by a portion 11 of the envelop 6; that is to say, the envelop is fitted around the outside of the strip 7 and bent inwardly to engage the inner or concave surface of the cushion shoe.

The inner tube is shown at 12 and engages the portion 11 of the envelop. This envelop, including the portion 11, is permeated with cement before being placed in position and the inner tube 12 is thus made to adhere to the portion 11, which in turn adheres to the cushion 8. The envelop 6 similarly adheres to the inner surface of the casing 1 and to the outer surface of the leather strip 7.

The casing 1 is provided with a portion 1ª which is not in immediate engagement with any part of the rim or with any part of the cushion 8. The portion 1ª of the casing has, by virtue of its freedom from engagement with other parts, as just stated, a considerable degree of resilience, which is more or less independent of any resilience due to elasticity of the cushion 8.

While the cushion 8 is preferably made of rubber, I do not wish to limit myself to the use of this particular material.

The cushion 8 constructed as above described, serves practically every purpose of a cushion tire, and in addition has a remarkable degree of strength and serves to retain other parts in proper position under comparatively rough usage. Besides, the cushion holds the inner tube 12 in proper position to render effective the pressure of air within this inner tube.

Should a wheel while in action strike a large obstacle, thus tending to cause a sudden jar to the vehicle, the portions 1ª of the tire casing bend or spring to a considerable extent, thus avoiding pinching or other injury to the inner tube, such as might otherwise be liable to cause the tube to burst. In the event of severe injury to the tire, complicated, it may be, by puncture of the inner tube, the shoe as a whole still serves as a cushion and the vehicle may be propelled for a reasonable distance after such injury to the wheel, and that, too, without material discomfort to the occupants of the vehicle.

I do not limit myself to the precise construction shown as variations may be made therein without departing from the spirit of my invention.

Having thus described my invention, what I claim as new and desire to secure by Letters Patent is as follows:—

In combination with a casing, a flexible envelop located therein and engaging the inner surface thereof, a cushion member located within said casing and having in cross section a substantially crescent form, said cushion member being provided with a plurality of passages extending in the general direction of the length thereof, some of said passages having larger cross section than others, the passages of larger cross section being located comparatively near the casing and equidistant therefrom, the passages of smaller cross section being severally located at varying distances from said casing, some of said passages of smaller cross section being located nearer together than the passages of larger cross section, and an inner tube located partially within said cushion member and partially within said casing.

REUBEN DAVID S. BENNETT.

Witnesses:
  WM. H. JEZZARD,
  P. H. JEZZARD.